US008801859B2

(12) United States Patent
Simard et al.

(10) Patent No.: US 8,801,859 B2
(45) Date of Patent: Aug. 12, 2014

(54) SELF-CLEANING APPARATUS AND METHOD FOR THICK SLURRY PRESSURE CONTROL

(75) Inventors: Michel Adam Simard, Berwyn, PA (US); Scott William Sommer, Phoenixville, PA (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

(21) Appl. No.: 13/366,651

(22) Filed: Feb. 6, 2012

(65) Prior Publication Data

US 2012/0279573 A1 Nov. 8, 2012

Related U.S. Application Data

(60) Provisional application No. 61/482,449, filed on May 4, 2011.

(51) Int. Cl.
*F15D 1/00* (2006.01)
*F15D 1/02* (2006.01)
*F16L 55/11* (2006.01)

(52) U.S. Cl.
CPC ........................................ *F15D 1/02* (2013.01)
USPC ................ 127/2; 162/232; 137/613; 137/614

(58) Field of Classification Search
CPC .............. B01J 4/00; B01J 4/001; B01J 4/008; F15D 1/00; F15D 1/02; F15D 1/025; F15D 1/0025; F16K 51/00; F16L 55/11; F16L 55/105
USPC .................. 137/1, 613, 614, 628, 637, 637.1; 127/1, 2, 46, 46.1, 47, 48, 53, 55; 162/1, 2, 14, 17, 18, 19, 100, 201, 233; 210/634, 696, 767
See application file for complete search history.

(56) References Cited

U.S. PATENT DOCUMENTS

| | | | | |
|---|---|---|---|---|
| 1,783,163 | A | 11/1930 | Griswold | |
| 1,938,802 | A * | 12/1933 | Braun et al. | 162/19 |
| 2,810,394 | A | 10/1957 | Ferguson | |
| 2,881,783 | A | 4/1959 | Andrews | |
| 3,792,719 | A | 2/1974 | Dickinson | |
| 3,896,005 | A | 7/1975 | Zuccolotto | |
| 3,918,471 | A | 11/1975 | Bedner | |

(Continued)

FOREIGN PATENT DOCUMENTS

| | | |
|---|---|---|
| EA | 6913 | 4/2006 |
| JP | 56045754 | 4/1981 |

(Continued)

OTHER PUBLICATIONS (Abstract) Evaluation of materials for use in letdown valves and coal feed pumps for coal liquefaction service, Electr Power Res Inst Rep EPRIAF, No. 579, 1978, 94.

(Continued)

*Primary Examiner* — Joseph Drodge
(74) *Attorney, Agent, or Firm* — Ballard Spahr LLP; Travis B. Gasa

(57) ABSTRACT

Self-cleaning apparatus and methods are disclosed for handling viscous fluids, such as thick solid-liquid slurries of lignocellulosic biomass and its components, under high pressure, using an array of retractable valves.

14 Claims, 3 Drawing Sheets

(56) References Cited

U.S. PATENT DOCUMENTS

| | | | | |
|---|---|---|---|---|
| 4,316,747 | A | 2/1982 | Rugg et al. | |
| 4,316,748 | A | 2/1982 | Rugg et al. | |
| 4,405,377 | A * | 9/1983 | Neuzil | 127/46.2 |
| 4,607,819 | A | 8/1986 | Spils | |
| 5,705,369 | A | 1/1998 | Torget et al. | |
| 6,022,419 | A | 2/2000 | Torget et al. | |
| 6,652,755 | B2 * | 11/2003 | Ikeda | 210/662 |
| 7,861,740 | B2 * | 1/2011 | Phallen et al. | 137/487.5 |
| 2004/0020854 | A1 * | 2/2004 | Ali et al. | 210/652 |
| 2004/0256323 | A1 * | 12/2004 | Pavone | 210/659 |
| 2007/0108036 | A1 * | 5/2007 | Siskin et al. | 201/21 |
| 2008/0029233 | A1 * | 2/2008 | Wingerson et al. | 162/60 |
| 2009/0118477 | A1 * | 5/2009 | Hallberg et al. | 530/500 |
| 2009/0121166 | A1 | 5/2009 | Gabelgaard | |
| 2010/0043782 | A1 * | 2/2010 | Kilambi et al. | 127/1 |
| 2010/0069626 | A1 | 3/2010 | Kilambi | |
| 2010/0170504 | A1 | 7/2010 | Zhang | |
| 2010/0326610 | A1 * | 12/2010 | Harvey et al. | 162/17 |
| 2012/0073685 | A1 * | 3/2012 | Morgan et al. | 137/613 |
| 2012/0103325 | A1 * | 5/2012 | Koenig et al. | 127/67 |
| 2012/0118828 | A1 * | 5/2012 | Hodge | 210/656 |

FOREIGN PATENT DOCUMENTS

| | | |
|---|---|---|
| JP | 57061083 | 4/1982 |
| JP | 11226385 | 8/1999 |
| JP | 2001347298 | 12/2001 |
| RU | 2291742 | 1/2007 |
| RU | 2374012 | 11/2009 |
| UA | 3413 | 12/1994 |
| WO | 8300370 | 2/1983 |
| WO | 9423226 | 10/1994 |
| WO | WO 03013714 | 2/2003 |
| WO | WO 2004043620 | 5/2004 |
| WO | 2010045576 | 4/2010 |
| WO | 2011091044 | 7/2011 |

OTHER PUBLICATIONS (Abstract) Evaluation of materials for use in letdown valves for coal liquefaction service, Annual Conference on Materials for Coal Conversion and Utilization (CONF-791014), Sep. 9-Nov. 1979.

Balhouse, "Design, fabrication, and evaluation of a spiral-flow letdown valve", Electric Power Research Institute, Advanced Power Systems Division, EPRI AP, 1981.

Kamada et al., "(Abstract) Development of letdown valve on pilot plant", Sekitan Kagaku Kaigi Happyo Ronbunshu, 35th, 1998, 459-462.

Li, "(Abstract) Analysis of failure cause in CCI pressure reducing valves used in product pipeline", Guandao Jishu Yu Shebei, (5), 2008, 34-36.

Steinke, "(Abstract) Valve solutions for high-pressure liquid letdown", Proceedings of the Symposium on Instrumentation for the Process Industries, 44th, 1989, 39-43.

Steinke et al., "(Abstract) Valve solutions for high pressure liquid letdown", Advances in Instrumentation, 42(3), 1987, 1381-1390.

Suitor et al., "Development of a coal slurry letdown valve", American Society of Mechanical Engineers, Fluids Engineering Division, vol. 23, 1985, 142-4.

International Application No. PCT/US2012/036600, "International Search Report and Written Opinion", mailed Nov. 23, 2012, 9 pages.

Decision on Grant issued Oct. 25, 2013 by the Russian Patent Office for Russian Application No. 2012154208, which was filed Apr. 2, 2012 (Inventor- Simard; Applicant Renmatix, Inc.) (pp. 1-9; pp. 1-6 of English translation).

* cited by examiner

SELF-CLEANING APPARATUS AND METHOD FOR THICK SLURRY PRESSURE CONTROL

CROSS-REFERENCE TO RELATED APPLICATIONS

This application claims the benefit of U.S. Application No. 61/482,449, filed May 4, 2011, the entire disclosure of which is incorporated herein by reference.

FIELD OF THE INVENTION

The present invention generally relates to apparatus and methods for handling viscous fluids. More particularly, it relates to self-cleaning apparatus and methods for handling viscous fluids, such as thick slurries of lignocellulosic biomass and its components, under high pressure.

BACKGROUND OF THE INVENTION

Backpressure control is critical to maintaining process conditions. However, with solid-liquid slurries, clogging of valves and orifices is a challenge. In addition, back pressure control valves cannot respond quickly enough and completely reseal to avoid bleed-through. Process pressure variations must be minimized to maintain process control. Thus, it would be beneficial to develop an efficient and reliable means for handling fouling fluids, such as thick solid-liquid slurries of lignocellulosic biomass and its components, under high pressure that minimize clogging, including, but not limited to those processed with compressible supercritical or near-critical fluids. The apparatus of methods of the present invention are directed toward these, as well as other, important ends.

SUMMARY OF THE INVENTION

In one embodiment, the invention is directed to self-cleaning apparatus for processing of a fouling fluid under pressure, comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages; and wherein at least one of said retractable valves is capable of being in an open position when the other of said retractable valves are partially closed.

In another embodiment, the invention is directed to methods for reducing fouling in processing of lignocellulolosic biomass, comprising:

providing a fouling fluid under pressure in an apparatus comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages; and retracting at least one of said retractable valves to an open position to form an open retractable valve when the other of said retractable valves are partially closed to clean said open retractable valve and to control pressure in said apparatus.

In yet another embodiment, the invention is directed to methods for controlling backpressure in processing of lignocellulolosic biomass, comprising:

providing a fouling fluid under pressure in an apparatus comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages; and retracting at least one of said retractable valves to an open position to form an open retractable valve when the other of said retractable valves are partially closed to clean said open retractable valve and to control pressure in said apparatus.

In further embodiments, the invention is directed to systems for processing fouling fluids, comprising:

at least one self-cleaning apparatus described herein; and tortuous path piping;

wherein said piping is upstream of said at least one self-cleaning apparatus.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1A:
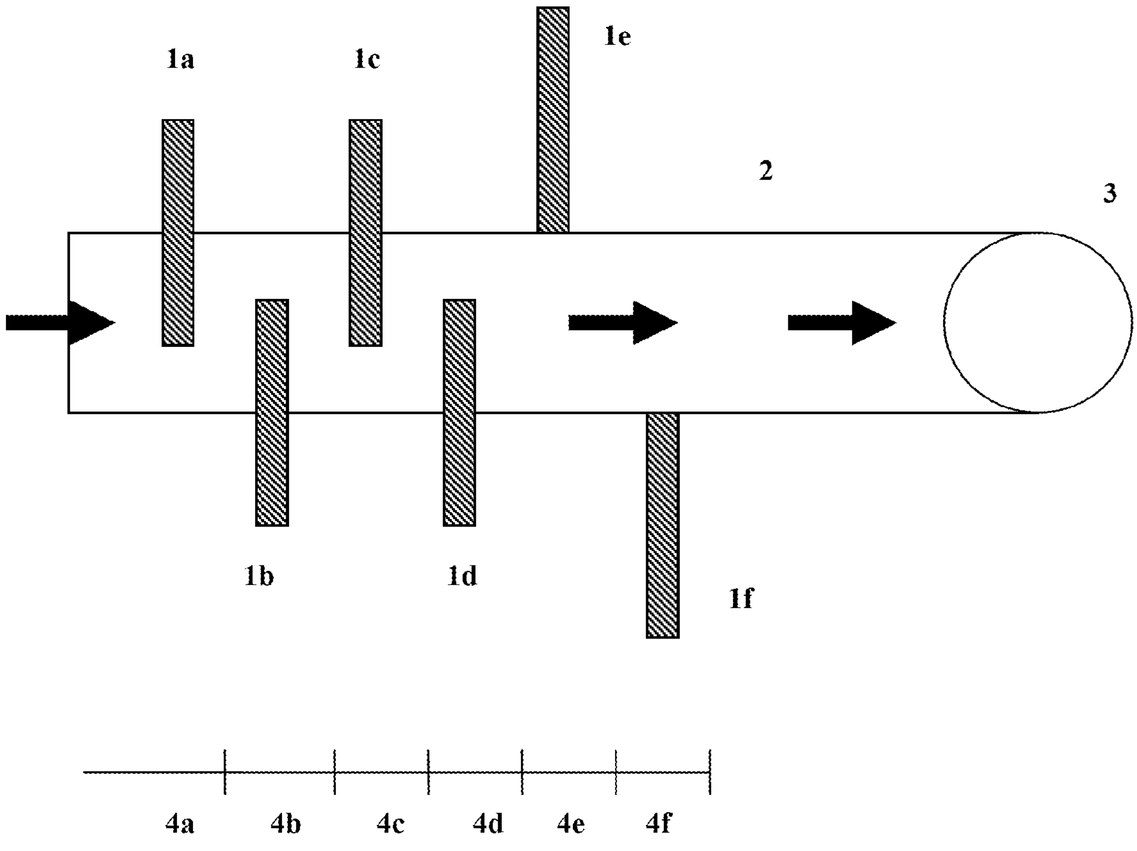
FIG. 1A is a schematic diagram using six retractable knife valves in one embodiment of the invention.

As employed above and throughout the disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides).

As used herein, "passageway" refers to a hollow chamber of any general cross-section, including varying cross-sections, used for conveying a material.

As used herein with reference to a valve, "open" means that the valve permits at least partial flow through the passageway. As used herein with reference to a valve, "closed" means that the valve permits no flow through the passageway. As used herein with reference to a "open" or "closed" valve, "partial" or "partially" means that the valve is not in its fully open or fully closed position, respectively, and therefore permits at least some flow through the passageway. "Partially open" and "partially closed" may be used interchangeably.

As used herein, "fouling fluid" refers to fluid, including a viscous liquid under the pressure and/or temperature conditions and solid-liquid slurries, that stick to the surfaces of the equipment in which it is in contact causing fouling of small passageways and orifices.

As used herein, "tortuous" refers to a path having more than one twists, bends, or turns.

As discussed above, backpressure control is critical to maintaining process conditions. However, with solid-liquid slurries, clogging of valves and orifices is a challenge. In addition, back pressure control valves cannot respond quickly enough and completely reseal to avoid bleed-through. Process pressure variations must be minimized to maintain process control. In the hydraulics of a system, a pump adds mechanical energy to the fluid to increase its pressure. The friction of the fluid along the pipes, valves, reactors and other components creates a pressure drop. Some friction losses are fixed, for example through a constant diameter pipe. Some pressure losses vary, for example through a valve whose opening is varied (large valve opening=less pressure loss). So pressure drop may be controlled by opening or closing the valve. A tortuous piping path is simply a way to increase the pressure drop in a shorter length. By making the piping path tortuous (many turns, twists, etc.), the pressure drop is greater The pressure drop can be designed in a piping system, but once they are installed, the pressure drop is fixed (since the pipes do not move). A partial blockage in the system will also create a pressure drop, that may be temporary if the partial blockage is eliminated. Thus, controlling the friction of the system is how the apparatus and methods of the invention compensate for sudden or temporary pressure changes due to the slurry blocking and hanging up somewhere along the system. If the fluid were water, the pressure losses in the system would be very stable, and a control valve at the back would probably be set in one position and never be touched. In the case of slurries, the pressure losses in the system fluctuate because of variations in consistency of the slurry (clumps), variations in viscosity, variations in temperature, and the like. What is needed is an apparatus and methods that permit constant adjustment of the positions of the valves to optimize the pressure drop across them. Retractable valves, especially those arranged in an alternating fashion which create in a tortuous path for the flow of material, that are partially open (or partially closed) create pressure drops. The retractable valves may be completely opened, thereby cleaning the valve and valve orifices and preventing a build up of solids in the passageway, especially when processing viscous fluids and slurries. The apparatus and methods of the invention, therefore, utilize retractable valves to overcome the issues associated with backpressure control by forming a valve array to provide the back pressure control.

Accordingly, in one embodiment, the invention is directed to self-cleaning apparatus for processing of a fouling fluid under pressure, comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages; and wherein at least one of said retractable valves is capable of being in an open position when the other of said retractable valves are partially closed.

The retractable valves that are used only when the primary retractable valves forming the tortuous path for the flow of material are opened for cleaning are referred to alternatively as "redundant" retractable valves. It is contemplated that certain retractable valves may be dedicated for use only when the other retractable valves are open for cleaning. It is also contemplated, however, that all of the retractable valves may at one time or another be considered a redundant valve. The apparatus of the invention may be used advantageously for processing/transporting solid-liquid slurry after fractionation of biomass and/or cellulose hydrolysis.

Figure 1B:
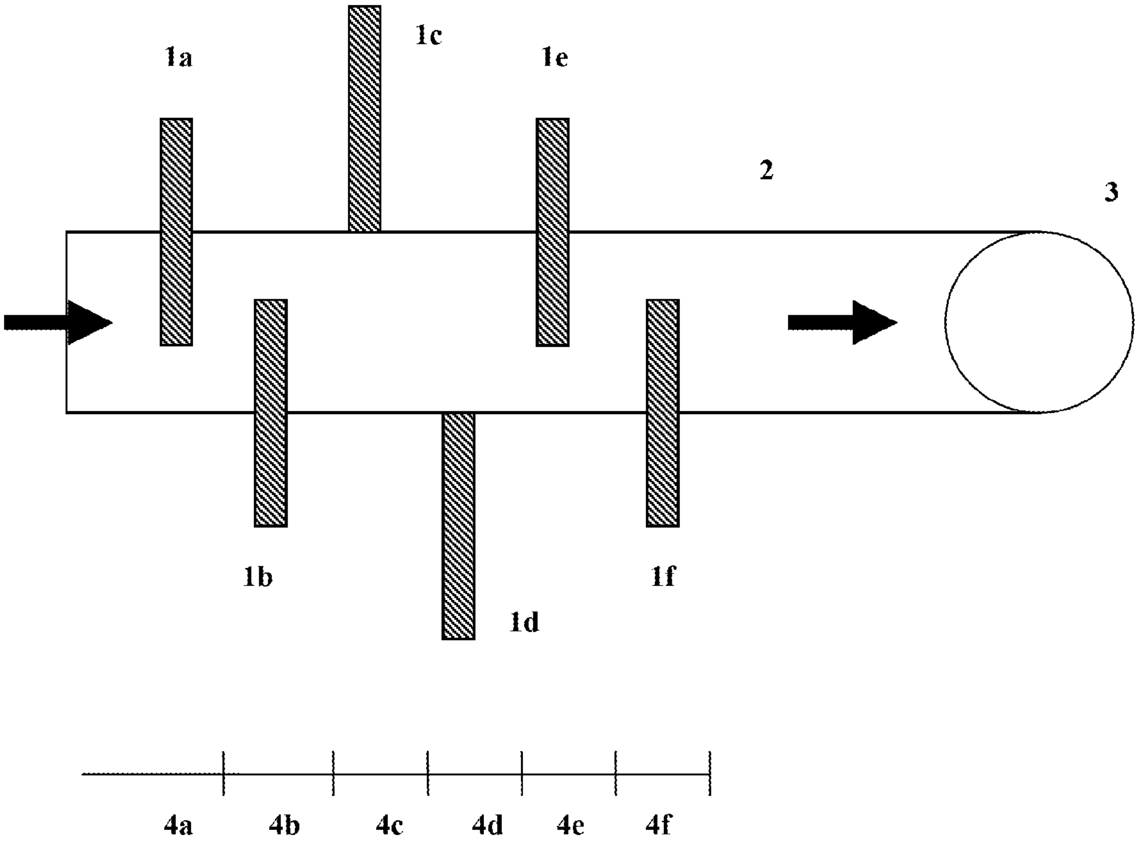
FIG. 1B is a schematic diagram using six retractable knife valves in one embodiment of the invention.

On embodiment of the self-cleaning apparatus is schematically shown in FIG. 1A, using six retractable knife valves 1*a*, 1*b*, 1*c*, 1*d*, 1*e*, and if in six stages (4*a*, 4*b*, 4*c*, 4*d*, 4*e*, and 4*f*, respectively) in passageway 2. In this figure, four of the retractable knife valves 1*a*, 1*b*, 1*c*, and 1*d*, are in a partially open position creating a tortuous path for the flow of material and two of the retractable knife valves 1*e* and 1*f* are in a fully open position. In FIG. 1B, knife valves 1*c* and 1*d* are opened fully in order to clean them, while knife valves 1*e* and 1*f* are partially closed to take over the duties of the former two. In effect, four of the retractable knife valves 1*a*, 1*b*, 1*e*, and 1*f*, are in a now partially open position creating a tortuous path for the flow of material and two other of the retractable knife valves 1*c*, and 1*d* are in a fully open position. A separate shutoff valve, here shown as a cone valve 3, may be present for full shut-off.

Figure 2:
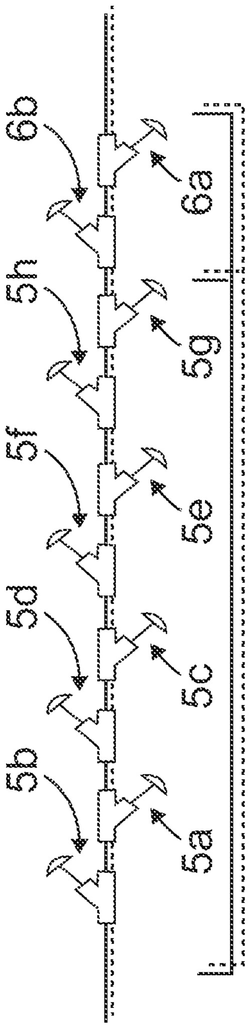
FIG. 2 is a schematic diagram using ten retractable valves in one embodiment of the invention.

FIG. 2 is a schematic diagram using ten retractable valves in one embodiment of the invention. Stages 1 to 8 (5*a*, 5*b*, 5*c*, 5*d*, 5*e*, 5*f*, 5*g*, and 5*h*, where Stage 1 corresponds to 5*a* and Stage 8 corresponds to 5*h*) create the initial pressure letdown and Stages A and B (6*a* and 6*b*, respectively) allow in-line cleaning for a total of ten stages with ten retractable valves. Flow of materials begins in Stage 1 and ends after Stage B. Stages A and B are redundant valves that permit for opening and cleaning of any two valves in the system (including Stages A and B) while the remaining valves are partially closed.

In another embodiment, the invention is directed to methods for reducing fouling in processing of lignocellulolosic biomass, comprising:

providing a fouling fluid under pressure in an apparatus comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages;

retracting at least one of said retractable valves to an open position to form an open retractable valve when the other of said retractable valves are partially closed to clean said open retractable valve and to control pressure in said apparatus.

In yet another embodiment, the invention is directed to methods for controlling backpressure in processing of lignocellulolosic biomass, comprising:

providing a fouling fluid under pressure in an apparatus comprising:

a passageway having at least two stages;

a retractable valve positioned in each of said at least two stages; and an optional shutoff valve positioned in said passageway;

wherein said retractable valves form a tortuous path in said passageway when said retractable valves are partially closed to permit a pressure drop between said stages; and retracting at least one of said retractable valves to an open position to form an open retractable valve when the other of said retractable valves are partially closed to clean said open retractable valve and to control pressure in said apparatus.

In further embodiments, the invention is directed to systems for processing viscous fluids, comprising:

at least one self-cleaning apparatus described herein; and tortuous path piping;

wherein said piping is upstream of said at least one self-cleaning apparatus.

In certain embodiments, the retractable valves are selected from the group consisting of a knife valve, needle valve, cone valve, ball valve, lobe valve, and combinations thereof.

The number of retractable valves is dependent on the viscosity of the material being processed, velocity, pressure, passageway diameter, fouling characteristics of the material, and the like. In certain embodiments, three retractable valves to about ten retractable valves are present. In certain preferred embodiments, six retractable valves are present. In certain preferred embodiments, eight retractable valves are present. As one skilled in the art will appreciate, the number of retractable valves will be dependent upon the particular equipment available.

In certain embodiments, at least one of said retractable valves is capable of being in an open position when the other of said retractable valves is partially closed.

It is contemplated that the retractable valves (of which there at least two but possibly many additional retractable valves) would open and close simultaneously and continuously (so that the equipment would never need to take any off-line to clean individual valves but would be constantly cleaning and maintaining adequate pressure.

The array of retractable valves may be in a large number of different arrangements (i.e., adjacent retractable valves are oriented at about 0° to about 180° to each other and may differ along the array). In certain embodiments, the array of retractable valves forms a tortuous path for the flow of materials through the passageway. Preferably, adjacent retractable valves are oriented at about 180° to each other to maximize the pressure loss per valve and minimize the number of total valves.

In certain embodiments, the step of processing includes transporting said fouling fluid under pressure.

In certain embodiments, the fouling fluid has a viscosity of at least about 10,000 cP. In certain embodiments, the fouling fluid has a viscosity of at least about 15,000 cP.

In certain embodiments, the fouling fluid is a fractionated lignocellulosic slurry comprising:

- a solid fraction comprising:
  - lignin; and
  - cellulose; and
- a liquid fraction comprising:
  - soluble $C_5$ saccharides; and
  - water.

In certain embodiments, the fouling fluid is a slurry comprising:

- a solid fraction comprising:
  - lignin; and
- a liquid fraction comprising:
  - soluble $C_6$ saccharides; and
  - water.

In certain embodiments, the passageway is substantially cylindrical. However, other shapes and cross-sections are possible.

In certain embodiments, at least one shutoff valve is present and may be used to fully shutoff flow in the passageway. The shutoff valve may positioned anywhere in the passageway, including within the array of retractable valves, before the array of retractable valves, or after the array of retractable valves in the distal end of the passageway (nearest exit of passageway in direction of flow). Preferably, it is positioned in the distal end of the passageway. Suitable shutoff valves include, but are not limited to, cone valves, ball valves, knife valves, needle valves, or lobe valves, wherein said valves may be used in the fully closed position to stop flow within the passageway.

The pressure drop in the apparatus of the invention will depend upon the particular material that is being processed. In certain embodiments, the pressure drop in said apparatus is about 50 bars to about 250 bars.

The methods of the invention are preferably run continuously, although they may be run as batch or semi-batch processes.

In certain embodiments, the fractionated lignocellulosic biomass slurry is prepared by contacting said lignocellulosic biomass with a first reaction fluid comprising hot compressed water and, optionally, carbon dioxide; wherein said first reaction fluid further comprises acid, when said lignocellulosic biomass comprises softwood; and wherein said first reaction fluid is at a temperature of at least about 100° C. under a pressure sufficient to maintain said first reaction fluid in liquid form. The acid may be an inorganic acid or an organic acid, or an acid formed in situ. Inorganic acid include, but are not limited to: sulfuric acid, sulfonic acid, phosphoric acid, phosphonic acid, nitric acid, nitrous acid, hydrochloric acid, hydrofluoric acid, hydrobromic acid, hydroiodic acid. Organic acids include, but are not limited to, aliphatic carboxylic acids (such as acetic acid and formic acid), aromatic carboxylic acids (such as benzoic acid and salicylic acid), dicarboxylic acids (such as oxalic acid, phthalic acid, sebacic acid, and adipic acid), aliphatic fatty acids (such as oleic acid, palmitic acid, and stearic acid), aromatic fatty acids (such as phenylstearic acid), and amino acids. In certain embodiments, the acid is preferably sulfuric acid, hydrochloric acid, phosphoric acid, nitric acid, or a combination thereof. Gaseous compounds that form acid in situ include, but are not limited to, $SO_2$.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A self-cleaning apparatus for processing of a fouling fluid under pressure, comprising:

a passageway extending continuously along an axis and having at least two stages;

a retractable valve positioned in each of said at least two stages, said retractable valves extending into said passageway and positioned in an orientation different from said axis and positioned in at least one of an alternating orientation and at an orientation of about 180 degrees relative to each other; and an optional shutoff valve positioned in said passageway;

wherein said retractable valves form a tortuous path in said passageway when said retractable valves are partially closed to permit a pressure drop between said stages; and wherein at least one of said retractable valves is capable of being in an open position when the other of said retractable valves are partially closed.

2. A self-cleaning apparatus of claim 1, wherein said retractable valve is a knife valve, needle valve, cone valve, ball valve, lobe valve, or combination thereof.

3. A self-cleaning apparatus of claim 1, wherein said shutoff valve is a cone valve, ball valve, knife valve, needle valve, or lobe valve.

4. A self-cleaning apparatus of claim 1, wherein three retractable valves to about ten retractable valves are present.

5. A self-cleaning apparatus of claim 1, wherein adjacent retractable valves are oriented at about 180° to each other.

6. A self-cleaning apparatus of claim 1, wherein said processing is transporting said fouling fluid under pressure.

7. A self-cleaning apparatus of claim 1, wherein said fouling fluid has a viscosity of at least about 10,000 cP.

8. A self-cleaning apparatus of claim 1, wherein said fouling fluid has a viscosity of at least about 15,000 cP.

9. A self-cleaning apparatus of claim 1, wherein said fouling fluid is a fractionated lignocellulosic slurry comprising:

- a solid fraction comprising:
  - lignin; and cellulose; and
a liquid fraction comprising:
soluble $C_5$ saccharides; and
water.

10. A self-cleaning apparatus of claim 1,
wherein said fouling fluid is a slurry comprising:
a solid fraction comprising:
lignin; and
a liquid fraction comprising:
soluble $C_6$ saccharides; and
water.

11. A self-cleaning apparatus of claim 1,
wherein said passageway is substantially cylindrical.

12. A self-cleaning apparatus of claim 1,
wherein said pressure drop in said apparatus is about 50 bars to about 250 bars.

13. A system for processing viscous fluid, comprising:
at least one self-cleaning apparatus of claim 1; and
tortuous path piping;
wherein said piping is upstream of said at least one self-cleaning apparatus.

14. A system of claim 13,
wherein said viscous fluid comprises lignocellulosic biomass or a component part thereof.

* * * * *